(12) United States Patent
Holden et al.

(10) Patent No.: US 12,445,694 B2
(45) Date of Patent: *Oct. 14, 2025

(54) DISTRIBUTION OF MULTIPLE SIGNALS OF VIDEO CONTENT INDEPENDENTLY OVER A NETWORK

(71) Applicant: Comcast Cable Communications, LLC, Philadelphia, PA (US)

(72) Inventors: Danial E. Holden, Littleton, CO (US); Austin Vrbas, Edgewater, CO (US); Mark Francisco, Clarksburg, NJ (US); Mike Harrell, Parker, CO (US); Robert Baker, Conifer, CO (US)

(73) Assignee: Comcast Cable Communications, LLC, Philadelphia, PA (US)

(*) Notice: Subject to any disclaimer, the term of this patent is extended or adjusted under 35 U.S.C. 154(b) by 23 days.

This patent is subject to a terminal disclaimer.

(21) Appl. No.: 18/329,198

(22) Filed: Jun. 5, 2023

(65) Prior Publication Data
US 2023/0319371 A1    Oct. 5, 2023

Related U.S. Application Data

(63) Continuation of application No. 13/006,904, filed on Jan. 14, 2011, now Pat. No. 11,711,592, which is a
(Continued)

(51) Int. Cl.
*H04N 7/18* (2006.01)
*H04N 13/194* (2018.01)
(Continued)

(52) U.S. Cl.
CPC ......... *H04N 21/816* (2013.01); *H04N 13/194* (2018.05); *H04N 19/597* (2014.11);
(Continued)

(58) Field of Classification Search
CPC .................................................... H04N 21/816
(Continued)

(56) References Cited

U.S. PATENT DOCUMENTS 3,701,846 A * 10/1972 Zenzefilis ............... H04N 5/781
                                                                  235/487
3,928,720 A * 12/1975 Watatani ............ H04N 1/00098
                                                                  370/514
(Continued)

FOREIGN PATENT DOCUMENTS

WO        2004/093459 A1    10/2004

OTHER PUBLICATIONS

Jan. 29, 2019—Canadian Office Action—2,795,694.
(Continued)

*Primary Examiner* — Leron Beck
(74) *Attorney, Agent, or Firm* — Banner & Witcoff, Ltd.

(57) ABSTRACT

A stereoscopic production solution, e.g., for live events, that provides 3D video asset distribution to multiple devices and networks is described. In some embodiments, live or recorded 3D video content may be accessible by different service providers with different subscribers/users and protocols across a network of the content provider. A first video signal corresponding to a first video feed for one eye of a viewer may be received and a second video signal corresponding to a second video feed for the second eye of the viewer may be received. The first video signal and the second video signal may be encoded. The encoded first video signal and the encoded second video signal may be transmitted independently over a network. The two video signals may be received and frame synced at an off-site location for eventual rendering to a display device.

30 Claims, 6 Drawing Sheets

Related U.S. Application Data continuation-in-part of application No. 12/755,382, filed on Apr. 6, 2010, now Pat. No. 10,448,083.

(51) Int. Cl.
| | |
|---|---|
| *H04N 19/597* | (2014.01) |
| *H04N 21/2187* | (2011.01) |
| *H04N 21/2365* | (2011.01) |
| *H04N 21/43* | (2011.01) |
| *H04N 21/462* | (2011.01) |
| *H04N 21/63* | (2011.01) |
| *H04N 21/81* | (2011.01) |

(52) U.S. Cl.
CPC ..... *H04N 21/2187* (2013.01); *H04N 21/2365* (2013.01); *H04N 21/43072* (2020.08); *H04N 21/4622* (2013.01); *H04N 21/631* (2013.01)

(58) Field of Classification Search
USPC ........................ 375/240.01–240.29
See application file for complete search history.

(56) References Cited

U.S. PATENT DOCUMENTS

| | | | | |
|---|---|---|---|---|
| 4,145,717 | A * | 3/1979 | Guif | H04N 7/162 380/223 |
| 4,491,879 | A * | 1/1985 | Fine | G11B 27/02 386/253 |
| 4,542,406 | A * | 9/1985 | Shimoyama | H04N 21/4305 375/E7.274 |
| 4,809,065 | A | 2/1989 | Harris et al. | |
| 4,821,097 | A * | 4/1989 | Robbins | H04N 5/607 348/720 |
| 5,264,964 | A | 11/1993 | Faris | |
| 5,537,151 | A | 7/1996 | Orr et al. | |
| 5,682,196 | A * | 10/1997 | Freeman | H04N 7/17318 348/E7.071 |
| 5,995,516 | A * | 11/1999 | Iwasaki | H04N 21/23602 375/E7.277 |
| 6,005,620 | A | 12/1999 | Yang et al. | |
| 6,055,012 | A | 4/2000 | Haskell et al. | |
| 6,072,832 | A | 6/2000 | Katto | |
| 6,097,435 | A | 8/2000 | Stanger et al. | |
| 6,108,379 | A | 8/2000 | Shikakura et al. | |
| 6,343,319 | B1 | 1/2002 | Abensour et al. | |
| 6,380,981 | B1 * | 4/2002 | Kasezawa | H04N 21/43072 375/E7.278 |
| 6,392,689 | B1 | 5/2002 | Dolgoff | |
| 6,504,990 | B1 | 1/2003 | Abecassis | |
| 6,532,075 | B1 | 3/2003 | Edwards et al. | |
| 6,573,819 | B1 | 6/2003 | Oshima et al. | |
| 6,674,484 | B1 | 1/2004 | Boland et al. | |
| 6,678,740 | B1 | 1/2004 | Rakib et al. | |
| 6,686,926 | B1 | 2/2004 | Kaye | |
| 6,704,034 | B1 | 3/2004 | Rodriguez et al. | |
| 6,747,610 | B1 | 6/2004 | Taima et al. | |
| 6,768,774 | B1 | 7/2004 | MacInnis et al. | |
| 6,795,863 | B1 | 9/2004 | Doty, Jr. | |
| 6,810,198 | B1 * | 10/2004 | Kuroda | H04N 9/8063 |
| 6,925,250 | B1 * | 8/2005 | Oshima | H04N 5/85 348/E13.058 |
| 6,978,306 | B2 | 12/2005 | Miller et al. | |
| 7,023,492 | B2 | 4/2006 | Sullivan | |
| 7,096,488 | B1 | 8/2006 | Zhang et al. | |
| 7,123,248 | B1 | 10/2006 | Lafleur | |
| 7,149,665 | B2 | 12/2006 | Feld et al. | |
| 7,394,977 | B2 | 7/2008 | Park et al. | |
| 7,522,664 | B1 | 4/2009 | Bhaskar et al. | |
| 7,733,385 | B2 * | 6/2010 | Watanabe | H04N 13/161 348/231.2 |
| 7,742,623 | B1 | 6/2010 | Moon et al. | |
| 7,777,692 | B2 * | 8/2010 | Yamada | H04N 9/3147 345/1.3 |
| 7,788,568 | B1 * | 8/2010 | Huang | H03M 13/01 709/224 |
| 7,809,061 | B1 | 10/2010 | Sarna | |
| 8,045,844 | B2 | 10/2011 | Sasaki et al. | |
| 8,073,060 | B2 * | 12/2011 | Compton | H04N 21/4305 348/521 |
| 8,189,033 | B2 | 5/2012 | Ikeda et al. | |
| 8,228,982 | B2 | 7/2012 | Qian et al. | |
| 8,249,992 | B2 | 8/2012 | Harkness et al. | |
| 8,260,090 | B2 * | 9/2012 | Ebato | H04N 21/8455 348/333.05 |
| 8,358,331 | B2 | 1/2013 | Suh et al. | |
| 8,743,178 | B2 | 6/2014 | Filippini et al. | |
| 8,786,673 | B2 | 7/2014 | Cheng et al. | |
| 2001/0026372 | A1 | 10/2001 | Misawa | |
| 2002/0008906 | A1 | 1/2002 | Tomita | |
| 2002/0009137 | A1 * | 1/2002 | Nelson | H04N 13/211 348/E13.064 |
| 2002/0034375 | A1 | 3/2002 | Suda | |
| 2002/0035723 | A1 | 3/2002 | Inoue et al. | |
| 2002/0070981 | A1 | 6/2002 | Kida | |
| 2002/0083464 | A1 | 6/2002 | Tomsen et al. | |
| 2002/0103919 | A1 | 8/2002 | Hannaway | |
| 2002/0122656 | A1 | 9/2002 | Gates et al. | |
| 2002/0144276 | A1 | 10/2002 | Radford et al. | |
| 2002/0158812 | A1 | 10/2002 | Pallakoff | |
| 2002/0158873 | A1 * | 10/2002 | Williamson | G06T 7/85 345/427 |
| 2002/0164153 | A1 * | 11/2002 | Tanaka | H04N 9/8042 386/241 |
| 2003/0052877 | A1 | 3/2003 | Schwegler et al. | |
| 2003/0053485 | A1 * | 3/2003 | Chuah | H04L 9/40 370/469 |
| 2003/0108341 | A1 | 6/2003 | Oshima et al. | |
| 2003/0112507 | A1 | 6/2003 | Divelbiss et al. | |
| 2004/0076331 | A1 | 4/2004 | Gioia | |
| 2004/0135819 | A1 | 7/2004 | Maa | |
| 2004/0181811 | A1 | 9/2004 | Rakib | |
| 2004/0207613 | A1 | 10/2004 | Morisawa | |
| 2004/0218269 | A1 | 11/2004 | Divelbiss et al. | |
| 2004/0218906 | A1 * | 11/2004 | Chaney | G11B 20/00855 360/60 |
| 2005/0041164 | A1 * | 2/2005 | Sato | H04N 5/74 348/602 |
| 2005/0096980 | A1 | 5/2005 | Koningstein | |
| 2005/0168693 | A1 * | 8/2005 | Mizer | G03B 21/32 352/40 |
| 2005/0212984 | A1 | 9/2005 | Wu et al. | |
| 2005/0262217 | A1 * | 11/2005 | Nonaka | H04N 21/43622 348/E7.071 |
| 2006/0015580 | A1 | 1/2006 | Gabriel et al. | |
| 2006/0098867 | A1 | 5/2006 | Gallagher | |
| 2006/0109200 | A1 | 5/2006 | Alden | |
| 2006/0153289 | A1 | 7/2006 | Choi et al. | |
| 2006/0171283 | A1 * | 8/2006 | Vijayan | H04L 1/0066 369/94 |
| 2006/0177124 | A1 | 8/2006 | Ha | |
| 2006/0221178 | A1 | 10/2006 | Yun et al. | |
| 2006/0262856 | A1 | 11/2006 | Wu et al. | |
| 2006/0268008 | A1 | 11/2006 | Idesawa et al. | |
| 2007/0014367 | A1 | 1/2007 | Zhou | |
| 2007/0115276 | A1 | 5/2007 | Yun et al. | |
| 2007/0136777 | A1 | 6/2007 | Hasek et al. | |
| 2007/0154171 | A1 | 7/2007 | Elcock et al. | |
| 2007/0169156 | A1 * | 7/2007 | Zeng | H04N 21/4305 725/86 |
| 2007/0180467 | A1 * | 8/2007 | Lee | H04N 21/4586 725/39 |
| 2007/0223538 | A1 | 9/2007 | Rodgers | |
| 2007/0247477 | A1 | 10/2007 | Lowry et al. | |
| 2007/0266412 | A1 | 11/2007 | Trowbridge et al. | |
| 2007/0282959 | A1 | 12/2007 | Stern | |
| 2008/0021834 | A1 | 1/2008 | Holla et al. | |
| 2008/0025195 | A1 * | 1/2008 | Yang | H04H 20/30 370/203 |
| 2008/0089428 | A1 | 4/2008 | Nakamura et al. | |
| 2008/0165116 | A1 | 7/2008 | Herz et al. | |
| 2008/0198920 | A1 | 8/2008 | Yang et al. | |

(56) References Cited

U.S. PATENT DOCUMENTS

| | | |
|---|---|---|
| 2008/0219381 A1 | 9/2008 | Karaoguz et al. |
| 2008/0247541 A1 | 10/2008 | Cholas et al. |
| 2008/0247726 A1 | 10/2008 | Lee et al. |
| 2008/0252719 A1 | 10/2008 | Choi et al. |
| 2008/0288977 A1 | 11/2008 | Howcroft et al. |
| 2009/0031361 A1 | 1/2009 | Song et al. |
| 2009/0052450 A1 | 2/2009 | Mockett |
| 2009/0073316 A1* | 3/2009 | Ejima ............... H04N 5/04 348/739 |
| 2009/0116732 A1 | 5/2009 | Zhou et al. |
| 2009/0141883 A1* | 6/2009 | Bastien ............ H04L 63/00 379/213.01 |
| 2009/0196345 A1 | 8/2009 | Nair et al. |
| 2009/0199230 A1* | 8/2009 | Kumar ............. G06Q 30/0268 725/32 |
| 2009/0245347 A1 | 10/2009 | Lee et al. |
| 2009/0288125 A1 | 11/2009 | Morioka |
| 2009/0289951 A1 | 11/2009 | Matsuda |
| 2009/0313659 A1 | 12/2009 | Samuels |
| 2009/0320084 A1 | 12/2009 | Azam et al. |
| 2010/0021141 A1 | 1/2010 | Yamashita et al. |
| 2010/0026794 A1 | 2/2010 | Chang |
| 2010/0046615 A1 | 2/2010 | Chen et al. |
| 2010/0053164 A1 | 3/2010 | Imai et al. |
| 2010/0053310 A1* | 3/2010 | Maxson ............. H04N 13/194 348/E13.001 |
| 2010/0064351 A1 | 3/2010 | Johansson et al. |
| 2010/0086285 A1 | 4/2010 | Sasaki et al. |
| 2010/0110199 A1* | 5/2010 | Winkler ............. H04N 19/85 348/180 |
| 2010/0111417 A1 | 5/2010 | Ward et al. |
| 2010/0118045 A1 | 5/2010 | Brown Elliott et al. |
| 2010/0134603 A1 | 6/2010 | Itoh |
| 2010/0141738 A1 | 6/2010 | Lee et al. |
| 2010/0166064 A1* | 7/2010 | Perlman ............ H04N 21/6377 375/240.07 |
| 2010/0166065 A1* | 7/2010 | Perlman ............ H04N 21/658 375/E7.173 |
| 2010/0171817 A1 | 7/2010 | Tourapis et al. |
| 2010/0182404 A1 | 7/2010 | Kuno |
| 2010/0208042 A1 | 8/2010 | Ikeda et al. |
| 2010/0208750 A1 | 8/2010 | Kim et al. |
| 2010/0215343 A1 | 8/2010 | Ikeda et al. |
| 2010/0215347 A1* | 8/2010 | Ikeda ............... H04N 13/161 386/212 |
| 2010/0226428 A1 | 9/2010 | Thevathasan et al. |
| 2010/0247079 A1 | 9/2010 | Zucker et al. |
| 2010/0254679 A1 | 10/2010 | Sasaki et al. |
| 2010/0260268 A1* | 10/2010 | Cowan ............. H04N 13/178 348/E13.001 |
| 2010/0263003 A1 | 10/2010 | Gupta et al. |
| 2010/0275238 A1 | 10/2010 | Nagasawa et al. |
| 2010/0289875 A1 | 11/2010 | Newton et al. |
| 2010/0321390 A1 | 12/2010 | Kim et al. |
| 2011/0012990 A1* | 1/2011 | Broberg ............. H04N 13/139 348/E13.001 |
| 2011/0012992 A1* | 1/2011 | Luthra ............. H04N 13/161 348/E13.001 |
| 2011/0032327 A1 | 2/2011 | Ikeda et al. |
| 2011/0032333 A1 | 2/2011 | Neuman et al. |
| 2011/0043614 A1 | 2/2011 | Kitazato |
| 2011/0050850 A1* | 3/2011 | Yamada ............ H04N 13/139 348/E13.001 |
| 2011/0058016 A1 | 3/2011 | Hulyalkar et al. |
| 2011/0109715 A1 | 5/2011 | Jing et al. |
| 2011/0111808 A1 | 5/2011 | Fields et al. |
| 2011/0141233 A1* | 6/2011 | Tsukagoshi ........ H04N 13/194 348/E13.001 |
| 2011/0164111 A1 | 7/2011 | Karaoguz et al. |
| 2011/0164121 A1 | 7/2011 | Ikeda et al. |
| 2011/0211049 A1 | 9/2011 | Bassali et al. |
| 2011/0216164 A1 | 9/2011 | Luthra |
| 2011/0217025 A1* | 9/2011 | Begen ............. H04N 21/23424 386/338 |
| 2011/0255003 A1 | 10/2011 | Pontual et al. |
| 2011/0291723 A1* | 12/2011 | Hashimoto ....... H04N 21/43072 327/161 |
| 2011/0317980 A1 | 12/2011 | Kato |
| 2012/0035498 A1 | 2/2012 | Wilkins |
| 2012/0113115 A1 | 5/2012 | Cuttner |
| 2012/0114036 A1 | 5/2012 | Po et al. |
| 2012/0162363 A1 | 6/2012 | Huang et al. |
| 2012/0176471 A1 | 7/2012 | Cheng et al. |
| 2013/0011117 A1 | 1/2013 | Hamada |
| 2013/0127990 A1 | 5/2013 | Lin et al. |
| 2013/0167186 A1 | 6/2013 | Sullivan et al. |

OTHER PUBLICATIONS

Aug. 14, 2019—Canadian Office Action—CA 2,735,591.
Apr. 14, 2021—Canadian Office Action—CA 2,795,694.
"AT&T U-verse TV Adds Six Free 3D I Max Theatre Films to 3D Technology Package, AT&T, Inc., Sep. 15, 2010, 8 downloaded Oct. 4, 2010 from http://www.eetimes.com/Generai/DisplayPrin!ViewContent?contentItemiD=4208544, 2 pages".
3-D TV not ready for prime lime, Nic Mokhoff, Aug. 14, 2008, downloaded Oct. 4, 2010, http://www.eetimes.com/General/Display/Prin!ViewContent?contentitemiD=4078303, 2 pages.
Is 3D Game ON?: Sports Could Kick-Start Market, Linda Hardesty, Jan. 1, 2010, downloaded on Mar. 23, 2010 from http://www.cable360.nel/cl/sections/features/Is-3D-Game-On-Sports-Could-Kick-Start-Markel.hlml.
MPEG-4 3D graphics player fits mobile handsets, Rich Nass, May 16, 2006, downloaded Oct. 4, 2010, http://www.eetimes.com/Generai/Display/PrintViewContent?contentItemiD=4084236, 1 page.
"Sensio enables manufacturers to offer easy access to library of 3D content through VOD providers, Apr. 1, 2011 by 26 BDroundabout, Jan. 4, 2011, downloaded Jan. 9, 2011, http://3droundabout.com/2011/01/518/sensio-enables-manufacturers-to-offer-access-to-library, 2 pages".
Sensio, History of 3D, © 2006 Sensio, downloaded Jan. 9, 2011, http:/www.sensio.tv/en/3d/3d_history/default.3d, 1 page.
CES 2011: SENSIO Launches Trio of 3D Technologies, Jason Dachman, Jan. 3, 2011 downloaded Jan. 9, 2011; http:sportsviodeo .org/main/blog/20 11/0 1/03/ces-20 1O -sensio-launches-trio-of-3d-technologies/print, 1 page.
Stereoscopic 3D content for the home unveiled at NAB, Dennis Barker, Apr. 15, 2008, downloaded Oct. 4, 2010 from http://www.eetimes.com/Generai/DisplayPrintViewContent?contentItemiD=41 03426.
Motorola Introduces Innovative 3D TV Set-Tops for Cable. Motorola Corporate, Apr. 12, 2010, downloaded Oct. 4, 2010 from http://www.eetimes.com/Generai/DisplayPrintViewContent?contentItemiD=4202924, 3 pages.
Grundig unveils 3D digital TV technique, Christoph Hammerschmidt, Sep. 6, 2005, downloaded Oct. 4, 2010 from http:!/www.eetimes.com/Generai/DisplayPrin!ViewContent?contentItemiD=4078545, 1 page.
Introducing DLP 3DTV, David C. Hutchinson and Ken Bell, Dec. 19, 2007, downloaded Oct. 4, 2010 from http://www.eetimes.com/Generai/DisplayPrin!ViewContent?contentItemiD=4013439, 6 pages.
CEA will explore 3DTV standard, Rick Merritt, Jul. 23, 2008, downloaded Oct. 4, 2010 from http://www.eetimes.com/Generai/DisplayPrin!ViewContent?contentitemiD=4078148, 2 pages.
AT&T U-verse TV Adds Six Free 3D I MAX Theatre Films to 3D Technology Package, AT&T, Inc., Sep. 15, 2010, downloaded Oct. 4, 2010 from http://www.eetimes.com/Generai/DisplayPrin!ViewContent?contentItemiD=4208544, 2 pages.
Trident offers three new ideas to bring 3D to mainstream TVs, Junko Yoshida, Sep. 3, 2010, downloaded Oct. 4, 2010 from http://www.eetimes.com/Generai/DisplayPrin!ViewContent?contentItemiD=4207346, 2 pages.
"3D TV User Interface to Any STB or CI+ Device to be Unveiled at ActiveVideo Networks Exhibit at IBC, Active Video 6 Networks, Sep. 2, 2010, downloaded Oct. 4, 2010 from hllp://www.eetimes.com/Generai/Display/PrintViewContent? DcontentItemiD=4208274, 2 pages".

(56) References Cited

OTHER PUBLICATIONS

3D TV—a distant perspective, Christoph Hammerschmidt, Sep. 7, 2009, downloaded Oct. 4, 2010 from http://www.eetimes.com/Generai/DisplayPrin!ViewContent?contentItemId=4196177, 2 pages.
Hardesty, Linda, "Is 3D Game On?: Sports Could Kick-Start Market," (Jan. 1, 2010), printed on Mar. 23, 2010 from http://www.cable360.net/ct/sections/features/Is-3D-Game-On-Sports-Could-Kick-Start-Market.html.
3DTV: The next format war?, Cliff Roth, Sep. 9, 2008, downloaded Oct. 4, 2010, http://www.eetimes.com/Generai/Display/Prin!ViewContent?contentItemiD=4030071, 1 page.
3-D TV not ready for prime time, Nic Mokhoff, Aug. 14, 2008, downloaded Oct. 4, 2010, http://www.eetimes.com/General/Display/PrintViewContent?contentItemiD=4078303, 2 pages.
TV giants are flalliners in stereo 3-D patents, Rick Merritt, Sep. 18, 2008, downloaded Oct. 4, 2010, http://www.eetimes.com/Generai/Display/Prin!ViewContent?contentItemiD=4005817, 3 pages.
Tekalp A M et al: "3DTV over IP, End-to-end streaming of multiview video", IEEE Signal Processing Magazine, IEEE Service Center, Piscataway, NJ, US, vol. 24, No. 6, Nov. 1, 2007 (2007-11-81), pp. 77-87, XP002689554, ISSN: 1053-5888, DOI: 10.1109/MSP.2007. 905878 Retrieved from the Internet: URL:http:f/elvera.nue.tu-berlin.de/files/1115Tekalp2007.pdf.
Anonymous: "ISO/IEC FDIS 23000-11 (Stereoscopic Video Application Format)", 86. MPEG Meeting; Oct. 13, 2008 - 17.10.2008; Busan; (Motion Pictureexpert Group or ISO/IEC JTC1/SC29/WG11), No. N10280, Jun. 11, 2009 (Jun. 11, 2009), XP838816773, ISSN: 0000-0038.
Anthony Vetro. "Representation and Coding Formats for Stereo and Multiview Video", Jan. 1, 2010 (Jan. 1, 2010). pp. 51-73, XP009162539.
TV giants are flatliners in stereo 3-D patents, Rick Merritt, Sep. 18, 2008, downloaded Oct. 4, 2010, http://www.eetimes.com/General/Display/PrintViewContent?contentItemID=4005817, 3 pages.
3DTV: The next format war?, Cliff Roth, Sep. 9, 2008, downloaded Oct. 4, 2010, http://www.eetimes.com/General/Display/PrintViewContent?contentItemID=4030071, 1 page.
Is 3D Game ON?: Sports Could Kick-Start Market, Linda Hardesty, Jan. 1, 2010, downloaded on Mar. 23, 2010 from http://www.cable360.net/ct/sections/features/Is-3D-Game-On-Sports-Could-Kick-Start-Market.html.
3d TV—a distant perspective, Christoph Hammerschmidt, Sep. 7, 2009, downloaded Oct. 4, 2010 from http://www.eetimes.com/General/DisplayPrintViewContent?contentItemId=4196177, 2 pages.
3D TV User Interface to Any STB or CI+ Device to be Unveiled at ActiveVideo Networks Exhibit at IBC, Active Video Networks, Sep. 2, 2010, downloaded Oct. 4, 2010 from http://www.eetimes.com/General/Display/PrintViewContent?contentItemID=4208274, 2 pages.
Trident offers three new ideas to bring 3D to mainstream TVs, Junko Yoshida, Sep. 3, 2010, downloaded Oct. 4, 2010 from http://www.eetimes.com/General/DisplayPrintViewContent?contentitemID=4207346, 2 pages.
AT&T U-verse TV Adds Six Free 3D IMAX Theatre Films to 3D Technology Package, AT&T, Inc., Sep. 15, 2010, downloaded Oct. 4, 2010 from http://www.eetimes.com/General/DisplayPrintViewContent?contentItemID=4208544, 2 pages.
CEA will explore 3DTV standard, Rick Merrill, Jul. 23, 2008, downloaded Oct. 4, 2010 from http://www.eetimes.com/General/DisplayPrintViewContent?contentItemID=4078148, 2 pages.
Introducing DLP 3DTV, David C. Hutchinson and Ken Bell, Dec. 19, 2007, downloaded Oct. 4, 2010 from http://www.eetimes.com/General/DisplayPrintViewContent?contentItemID=4013439, 6 pages.
Grundig unveils 3D digital TV technique, Christoph Hammerschmidt, Sep. 6, 2005, downloaded Oct. 4, 2010 from http://www.eetimes.com/General/DisplayPrintViewContent?contentItemID=4078545, 1 page.
Motorola Introduces Innovative 3D TV Set-Tops for Cable, Motorola Corporate, Apr. 12, 2010, downloaded Oct. 4, 2010 from http://www.eetimes.com/General/DisplayPrintViewContent?contentItemID=4202924, 3 pages.
Stereoscopic 3D content for the home unveiled at NAB, Dennis Barker, Apr. 15, 2008, downloaded Oct. 4, 2010 from http://www.eetimes.com/General/DisplayPrintViewContent?contentItemID=4103426.
3D TV Service will start, Han Jung-hoon, Sep. 10, 2009, etnews.co.kr, 1 page.
Sensio Technologies Launches 3D Content Distribution Services, The Hollywood Reporter, downloaded Jan. 9, 2011 from http://www.hollywoodreporter.com/news/sensio-technologies-launches-3d-content-67784, 1 page.
Fans see USC-Ohio State Game in 3-D, Los Angeles Times, Mark Medina, Sep. 13, 2009, 2 pages.
Insight Media, The State of 3D in the Home—Apr. 2010, A presentation by Insight Media for the 3D @ Home Consortium, http;//www.InsightMedia.Info, 47 pages.
3D Video on Demand arrives on Orange TV in France, Orange Press Release, Paris, Nov. 8, 2010, 2 pages.
Overview of MPEG Standards for 3D TV, White Paper, Motorola, www.motorola.com, ©Motorola, Inc. 2010, 4 pages.
CES 2011: SENSIO Launches Trio of 3D Technologies, Jason Dachman, Jan. 3, 2011 downloaded Jan. 9, 2011; http://sportsviodeo.org/main/blog/2011/01/03/ces-2010-sensio-launches-trio-of-3d-technologies/print, 1 page.
Sensio, History of 3D, © 2006 Sensio, downloaded Jan. 9, 2011, htlp:/www.sensio.tv/en/3d/3d_history/default.3d, 1 page.
Technology/Manufacturer Sensio 3DTechnology, The 3D Reborn, © 2006 Sensio, downloaded Jan. 9, 2011, http://www. sensio.tv/en/technologie_manufacturier/default.3d, 2 pages.
Trident, Video Processing Required for 3DTV Displays, Markus Schu, 7 pages, Undated.
NXP, Video Processing for Stereoscopic Content, Dr. E.B. Sellers, O.P. Ganwal and P. de Greef, 12 pages, Undated.
3D@Home Consortium, Accelerating the adoption of quality 3D into homes worldwide, downloaded Dec. 20, 2010; http://www.3dathome.org/resources-glossary.aspx, 27 pages.
Sensio enables manufacturers to offer easy access to library of 3D content through VOD providers, Apr. 1, 2011 by BDroundabout, Jan. 4, 2011, downloaded Jan. 9, 2011, http://3droundabout.com/2011/01/518/sensio-enables-manufacturers-to-offer-access-to-library, 2 pages.
MPEG-4 3D graphics player fits mobile handsets, Rich Nass, May 16, 2006, downloaded Oct. 4, 2010, http://www.eetimes.com/General/Display/PrintViewContent?contentItemID=4084236, 1 page.
"Sky Makes 3D History", Sky 3D channel to launch in April (Jan. 28, 2010), printed on Feb. 12, 2010 from http://www.skysports.com/story/0,19528,11096_5889013,00.html.
Partial European Search Report—EP11160925.1—Mailing Date: Apr. 19, 2013.
PCT International Search Report—PCT/US2011/21373—Mailed Mar. 9, 2011.
PCT International Search Report—PCT/US2011/021377—Mailed Mar. 15, 2011.
Extended European Search Report—EP 11160925—Mailing Date: Aug. 27, 2013.
A. M. Tekalp, E. Kurutepe and M. R. Civanlar, "3DTV over IP," in IEEE Signal Processing Magazine, vol. 24, No. 6, pp. 77-87, Nov. 2007, doi: 10.1109/MSP.2007.905878.
Information technology—Multimedia application format (MPEG-A)—Part 11: Stereoscopic video application format, ISO/IEC FDIS JTC 1/SC 29, dated Jan. 30, 2009.
Extended European Search Report—EP 11766291.6—Mailing Date: Sep. 25, 2013.
Aksay, Anil et al., "End-to-end stereoscopic video streaming with content-adaptive rate and format control," Signal Processing: Image Communication (2007).
Vetro et al., Frame Compatible Formats for 3D Video Distribution, 2010.
European Examination Report—EP Application 11160925.1—dated Jan. 13, 2015.
Anthony Vetro. "Representation and Coding Formats for Stereo and Multiview Video", Jan. 1, 2010. pp. 51-73.
European Search Report—EP App. 11855691.9—Feb. 25, 2015.
European Office Action—EP 11766291.6—Dated Apr. 24, 2015.

(56) References Cited

OTHER PUBLICATIONS

Response to European Office Action—EP 11160925.1—Dated May 18, 2015.
Response to European OA—EP Appl. 11766291.6—submitted Aug. 24, 2015.
Response to European Office Action—EP 11855691.9—Dated Sep. 11, 2015.
European Office Action—EP App 11766291.6—Mailed Feb. 16, 2016.
Canadian Office Action—CA Appl. 2,795,694—dated Jan. 19, 2017.
Canadian Office Action—CA Appl. 2,824,708—dated Jan. 24, 2017.
Mar. 10, 2017—Canadian Office Action—CA 2735591.
Mar. 21, 2017—European Office Action—EP 11855691.9.
Jan. 22, 2018—Canadian Office Action—CA 2,795,694.

* cited by examiner

DISTRIBUTION OF MULTIPLE SIGNALS OF VIDEO CONTENT INDEPENDENTLY OVER A NETWORK

CROSS-REFERENCE TO RELATED APPLICATIONS

This application is a continuation of and claims priority to U.S. patent application Ser. No. 13/006,904, filed Jan. 14, 2011, which is a continuation-in-part of U.S. patent application Ser. No. 12/755,382, filed Apr. 6, 2010 (now U.S. Pat. No. 10,448,083), each of which is hereby incorporated by reference in its entirety.

BACKGROUND

As more video content becomes available in both two dimensional (2D) and three dimensional (3D) appearances, more demands are placed on service providers to provide users with access to the video content in a number of different manners and to a number of different users across different service providers.

With the emergence of 3D video content offerings by service providers to viewers, live events, such as sporting events, may be captured with stereoscopic cameras and production equipment. There will always be a demand for more 3D video content offerings to more viewers across more service providers. As some service providers gain exclusive access rights for video content distribution of certain content, such as 3D content, a demand is placed for creating architectures to allow other service providers to access and offer such video content to viewers.

SUMMARY

The features described herein relate generally to acquiring, formatting, and distributing live video content and other content signals to a variety of devices in multiple geographies. Some features described herein relate to preserving stereoscopic effect for formatting and distribution of live 3D video content.

Aspects of the present disclosure describe a stereoscopic production solution, e.g., for live events, that provides 3D video asset distribution to multiple devices and networks. The production solution centralizes stereoscopic signal multiplexing, audio synchronization, compression, file capture and for distribution over networks such as broadband networks. In some embodiments, live or recorded 3D video content may be accessible by different service providers with different subscribers/users and protocols across a network of the content provider.

The preceding presents a simplified summary in order to provide a basic understanding of some aspects of the disclosure. The summary is not an extensive overview of the disclosure. It is neither intended to identify key or critical elements of the disclosure nor to delineate the scope of the disclosure. The summary merely presents some concepts of the disclosure in a simplified form as a prelude to the description below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized and structural and functional modifications may be made, without departing from the scope of the present disclosure.

Aspects of the present disclosure describe a distribution architecture that allows client adaptation (multiple CODECs, multiple bitrates, multiple transports), higher reliability by, e.g., placing critical components in monitored facilities with uninterrupted power sources, and redundancy.

Aspects of the disclosure may be made operational with numerous general purpose or special purpose computing system environments or configurations. Examples of computing systems, environments, and/or configurations that may be suitable for use with features described herein include, but are not limited to, personal computers, server computers, hand-held or laptop devices, multiprocessor systems, microprocessor-based systems, set top boxes, digital video recorders, programmable consumer electronics, Internet connectable display devices, network PCs, minicomputers, mainframe computers, distributed computing environments that include any of the above systems or devices, and the like.

The features may be described in the general context of computer-executable instructions, such as program modules, being executed by a computer. Generally, program modules may include routines, programs, objects, components, data structures, etc. that perform particular tasks or implement particular abstract data types. Features herein may also be practiced in distributed computing environments where tasks are performed by remote processing devices that are linked through a communications network. In a distributed computing environment, program modules may be located in both local and remote computer storage media including memory storage devices. Although described in relation to IP video, concepts of the present disclosure may be implemented for any format capable of carrying 3D video content.

Figure 1:
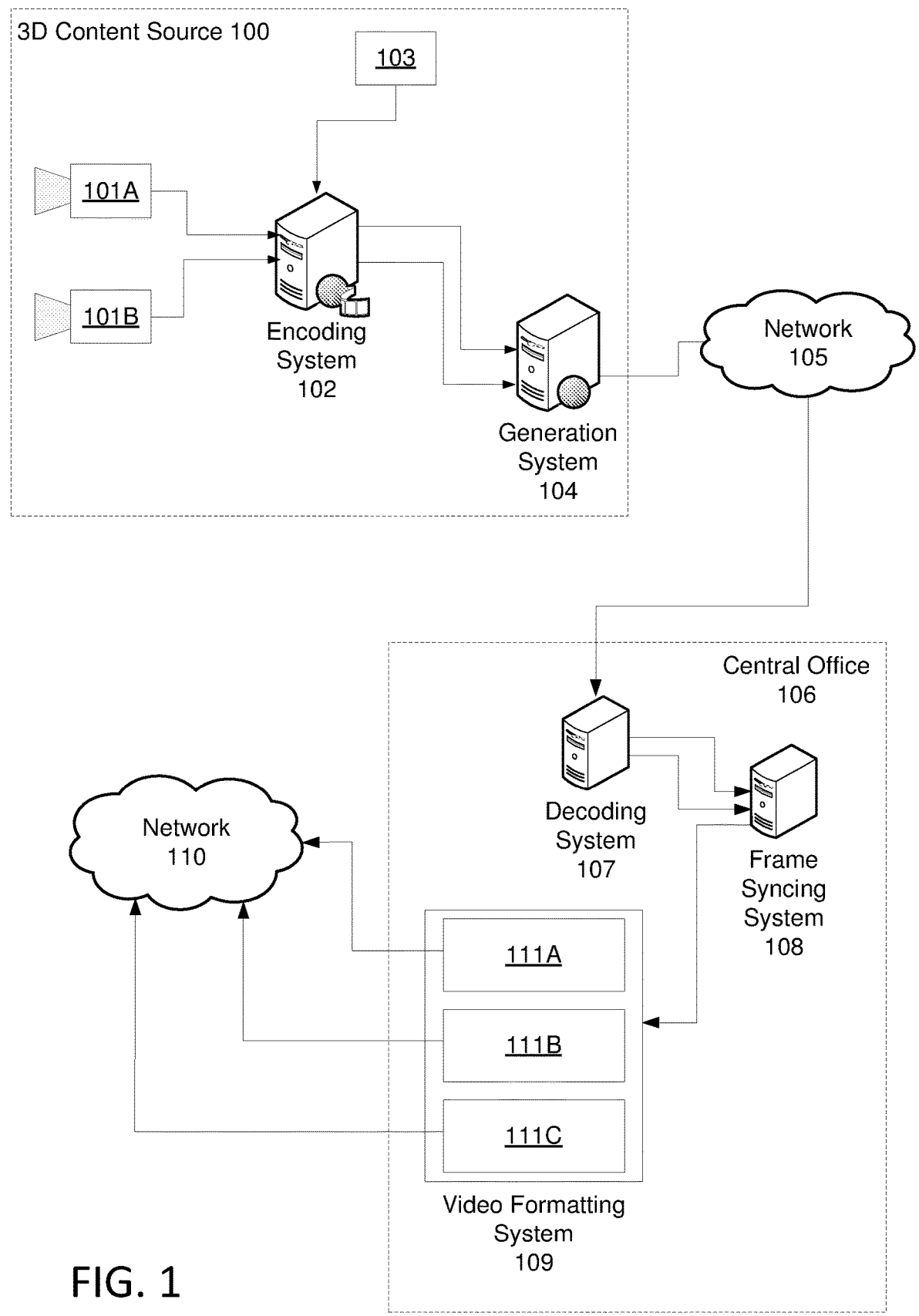
FIG. 1 illustrates an example communication or content distribution network in accordance with one or more aspects of the present disclosure.

FIG. 1 illustrates an example communication distribution network in accordance with one or more aspects of the present disclosure. Aspects of the network allow for streaming of 3D video content over a packet switched network, such as the Internet. One or more aspects of the network are adapted to deliver 3D stereoscopic content to Internet (or another public or local network) connected display devices.

Still other aspects of the network adapt stereoscopic content to a variety of network interface device technologies, including devices capable of rendering two dimensional (2D) and 3D content.

3D video content, including live 3D video content, may be created and/or offered by one or more 3D content sources 100. The sources 100 may capture 3D video content using one or more cameras 101A and 101B. Cameras 101A and/or 101B may be any of a number of cameras that are configured to capture video content. In accordance with one or more aspects of the present disclosure, cameras 101A and 101B may be configured to capture video content for a left eye and a right eye, respectively, of an end viewer. The captured video content from cameras 101A and 101B may be used for generation of 3D video content for transmission, e.g., to an end user output device. In yet other configurations, a single camera 101A or 101B may be utilized for capturing of 2D video content. In such configurations, the captured video content form camera 101A or 101B may be used for generation of 2D video content for transmission to a user output device.

The data output from the cameras 101A and/or 101B may be sent to an encoding (e.g., stereographer/production/video processing) system 102 for initial processing of the data. Such initial processing may include any of a number of processing of such video data, for example, cropping of the captured data, color enhancements to the captured data, and association of audio to the captured video content.

An optional audio recording system 103 may capture audio associated with the video signal from the cameras 101A and 101B and generate a corresponding audio signal. Alternatively, cameras 101A/B may be adopted to capture audio. The audio captured may, for example, include spoken words in an audio track that accompanies the video stream and/or other audio associated with noises and/or other sounds. Audio recording system 103 may generate an audio signal that may be inserted, for example, at corresponding time sequences to the captured video signals in the encoding system 102.

The audio track may be directly associated with the images captured in the video signal. For example, cameras 101A and/or 101B may capture and generate data of a video signal with an individual talking and the audio directly associated with the captured video may be spoken words by the individual talking in the video signal. Alternatively and/or concurrently, the audio track also may be indirectly associated with the video stream. In such an example, the cameras 101A and/or 101B may capture and generate data of a video signal for a news event and the audio indirectly associated with the captured video may be spoken words by a reporter not actually shown in the captured video.

For example, data from the encoding system 102 may be 3D video content corresponding to two signals of live video content of a sporting event. Audio recording system 103 may be configured to capture and provide audio commentary of a sports analyst made during the live sporting event, for example, and encoding system 102 may encode the audio signal to one or more video signals generated from cameras 101A, 101B. Alternatively, the audio signal may be provided as a separate signal from the two video signals. The audio signal from the audio recording system 103 and/or the encoding system 102 may be sent to a stream generation system 104, to generate multiple digital datastreams (e.g., Internet Protocol streams) for the event captured by the cameras 101A, 101B.

The stream generation system 104 may be configured to transmit at least two independent signals of captured and/or processed video data from cameras 101A and 101B. The data may be compressed in accordance with a particular protocol and/or for transmission of the signals across a particular type of infrastructure for data transmission. For example, compression of the video may allow for transmission of the captured video signals across a greater distance while using less bandwidth in comparison to no compression of the captured video signals. The audio signal added by the audio recording system 103 also may be multiplexed with one or both of the two video signals. As noted above, the generated signals may be in a digital format, such as an Internet Protocol (IP) encapsulated format. By transmitting each video signal for respective eyes of a viewer as two separate/independent signals, data integrity is better maintained and fewer resources are used. Independent or separate video signals, for example, have not been frame synced to the other between a video image and/or audio capturing location, e.g., an on-site location, and a central processing point in the infrastructure of a service provider, e.g., an off-site location. A single centralized processing point for video frame synchronization enables a service provider, for example, to capture and process video for 3D implementation with minimal equipment needed at on-site locations.

The single or multiple encapsulated IP streams may be sent via a network 105 to any desired location. In the example of captured 3D video with camera 101A capturing a video signal for one eye of a viewer and camera 101B capturing a video signal for the other eye of the viewer, two separate or independent encapsulated IP streams may be sent via the network 105 to a desired location, such as central office 106. The network 105 can be any type of communication network, such as satellite, fiber optic, coaxial cable, cellular telephone, wireless (e.g., WiMAX), twisted pair telephone, etc., or any combination thereof. In some embodiments, a service provider's central office 106 may make the content available to users.

The central office 106 may include, for example, a decoding system 107 including one or more decoders for decoding received video and/or audio signals. In the example configuration for processing 3D video signals, decoding system 107 may be configured to include at least two decoders for decoding two video signals independently transmitted from the stream generation system 104. Decoding system 107 may be configured to receive the two encoded video signals independently. Decoding system 107 may further be configured to decompress the received video signals, if needed, and may be configured to decode the two signals as the first and second video signals corresponding to the video signal captured for the left eye of a viewer and the video signal captured for the right eye of the viewer.

In the case of an audio signal being transmitted with the associated video signals, decoding system 107 further may be configured to decode the audio signal. In one example, an audio signal corresponding to audio captured with associated video content may be received as part of one of the two video signals received from a stream generation system 104. In such an example, one of the video signals may be for the right eye of a viewer and the other video signal may be for the left eye. The audio signal may be received as an encoded combined signal with the left and/or right eye signal.

Upon receipt of the two, or more, video signals, e.g., one for the right eye of a viewer and the other as a combined signal, one signal being for the left eye of the viewer and one being the audio signal, decoding system 107 may be configured to decode the first video signal, e.g., the video signal for the right eye of the viewer, and to decode the second video signal, e.g., the combined signal. The combined signal may be decoded to the video signal for the left eye of the viewer and the audio signal.

The two, or more, video signals received by decoding system 107 may be compressed video signals. The two video signals may be compressed, for example, for transmission purposes in order to reduce the use of bandwidth and/or to operate with a service provider's infrastructure for transmission of video signals. In such examples where the video signals are compressed, decoding system 107 may be configured to decompress the video signals prior to, concurrent with, and/or after decoding the video signals.

Figure 2:
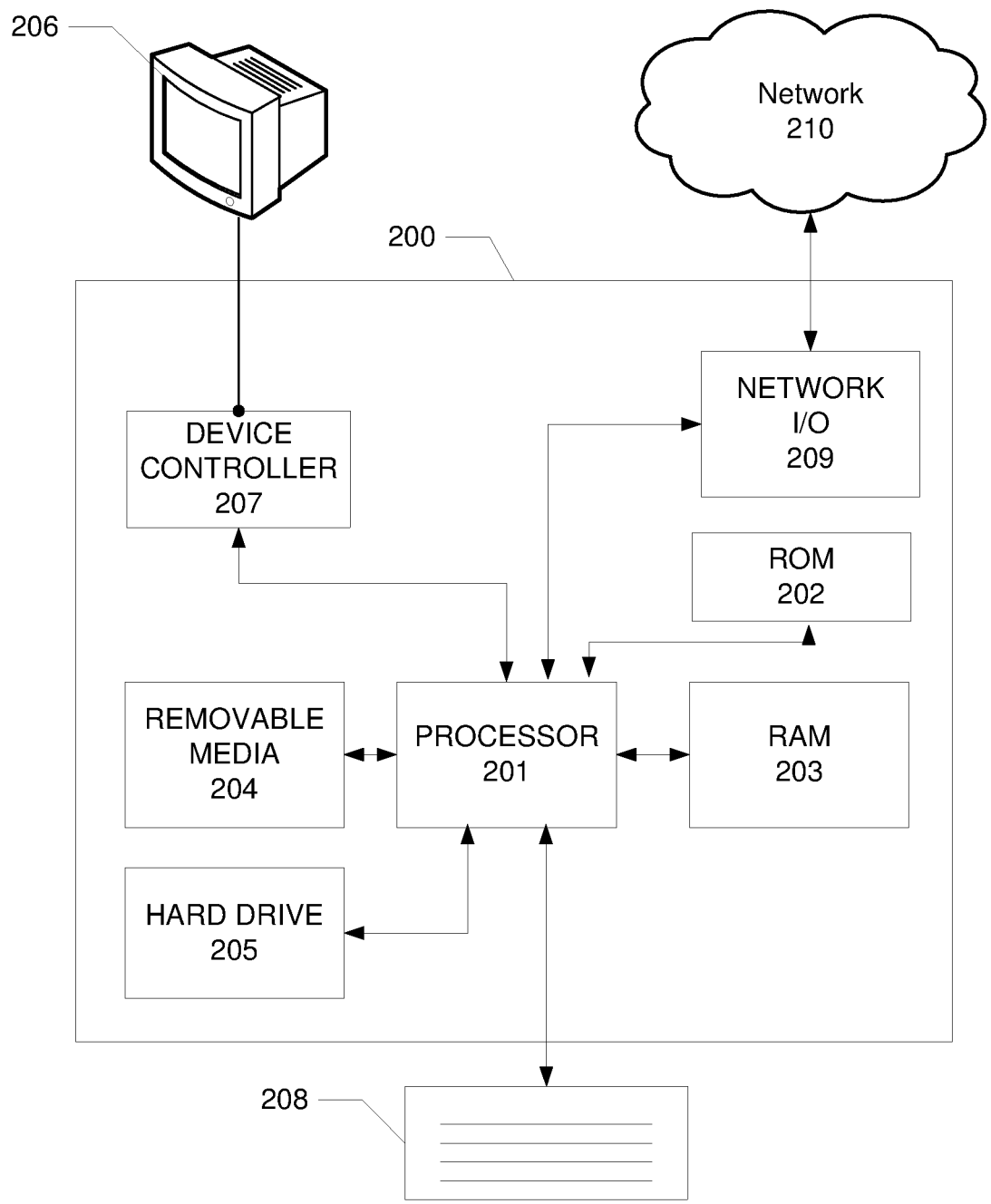
FIG. 2 illustrates an example hardware architecture that can be used to implement various features of the disclosure.

Operatively connected to decoding system 107 may be a frame syncing system 108, which may be combined as a computing device as depicted in FIG. 2 (discussed below). Frame syncing system 108 may be configured to compare time codes for each frame of video content in the first video signal with those for each frame of video content in the second signal. The syncing system 108 may match frames by time codes to produce a frame synced video signal in which each frame contains the left and right eye data, e.g., images, which occur at the same time in the video program. In the example of 3D video content for viewers, a frame synced video signal may be utilized by an output device of a viewer. The output device may output the frame synced video signal in a manner appropriate for a corresponding viewing device to render the video as a 3D video appearance. The resulting output from the syncing system 108 may be a single stream of the frame synced signal. The left and right eye video may drift during transport. As long as the drift is consistent, it may be corrected on the receive side of the transport.

For example, a viewer may utilize an active shutter headgear/eye gear that reads a video signal from an output device as an over/under format. In such an example, the active shutter headgear may be configured to close the shutters for one eye and open the shutters of the other eye of the headgear per respective frame of video content. As such, an appearance of 3D images may be created for a viewer.

Options for methods of frame syncing a first video signal with a second video signal include, but are not limited to, over/under syncing, e.g., top/bottom, side by side full syncing, alternative syncing, e.g., interlaced, frame packing syncing, e.g., a full resolution top/bottom format, checkerboard syncing, line alternative full syncing, side-by-side half syncing, and 2D+ depth syncing. These example methods are illustrative and additional methods may be utilized in accordance with aspects of the disclosure herein.

In the example of an audio signal included with one or both of the video signals as a combined signal, upon decoding of the audio signal by a decoding system 107, frame syncing system 108 may be configured to sync the audio signal with the frame synced video signal. The process of syncing the audio signal with the by frame syncing system 108 may include identifying a time sequence of the frame synced video signal to insert the corresponding audio signal. In an example where only video for the right eye of the viewer is compressed by the right eye encoder and where video for the left eye of the viewer and audio are both compressed by the left eye encoder, the left eye encoder runs slower than the right eye encoder. The extra processing of audio on the left eye path results in this stream taking longer to compress. On the receive site, all of the video and audio may be decompressed and then reassembled as the independent left eye video, right eye video, and audio. Because of the processing time for procession by the left eye encoder, the delta in delivery times between the left eye and right eye delivery paths may be compensated for.

Operatively connected to frame syncing system 108 may be a video formatting system 109. Video formatting system 109 may be configured to receive a frame synced video signal from the frame syncing system 108. The frame synced video signal includes a first video signal corresponding to a first video feed for one eye of a viewer and a second video signal corresponding to a second video feed for the other eye of the viewer. Video formatting system 109 may compress the frame synced video signal into a plurality of compressed frame synced video signals. Each compressed frame synced video signal may be compressed according to a different format, e.g., for different transmission systems and/or different user devices.

In the example of FIG. 1, video formatting system 109 may include three different compression format devices for compressing a frame synced video signal before transmission across a network 110. The three different compression format devices may be, for example, H.264 component 111A, MPEG2 component 111B, and Windows Media 9 component 111C. By taking the output the event back to baseband, the video may be multicast to multiple encoding and distribution platforms using IP technology. Video is multicast using IP to multiple video compression platforms. Previous technologies would have used an SDI router to deliver the video to multiple compression platforms. By using IP multicast, it is possible to feed the video to multiple compression and transport platforms. The present disclosure is not limited to three video CODECs. Using aspects of the present disclosure, it is possible to add any number of CODECs. Others include Flash, On2, MPEG-1, Smooth, and Zeri. Additional and/or alternative format devices or systems may be included as desired or required.

Component 111A may be configured to compress the frame synced video signal to H.264 format, for example, which may be a format often utilized for set-top boxes of users of service providers. Component 111B may be configured to compress the frame synced video signal to MPEG2 format, for example, which may be a format often utilized for home computers of users, e.g., subscribers, of service providers. Component 111C may be configured to compress the frame synced video signal to Windows Media 9 format, for example, which may be a format often utilized for streaming video to users. Although FIG. 1 shows H.264 component, MPEG2 component and Windows Media 9 component as three illustrative compression format devices, the disclosure is not so limited and may include any format of compression of video and number of components. The present disclosure should not be interpreted as being limited to the examples provided herein.

Video formatting system 109 may be configured to encode the 3D video content for a plurality of different formats for different end devices that may receive and output or render the 3D video content. Video formatting system 109 may be configured to generate a plurality of Internet protocol (IP) streams of encoded 3D video content specifically encoded for the different formats for rendering.

The different formats may correspond to different types of rendering/display devices that a user would use to view the 3D content. For example, one set of two of the IP streams may be for rendering the 3D video content on a display being utilized by a polarized headgear system, while another set of two of the IP streams may be for rendering the 3D video content on a display being utilized by an anaglyph headgear system. Any of a number of technologies for rendering and/or viewing rendered 3D video content may be utilized in accordance with the concepts disclosed herein. Although anaglyph and polarized headgear are used as examples herein, other 3D headgear types or display types may be used as well, such as active shutter and dichromic gear.

Video formatting system 109 may be connected to network 110, which can be any type of communication network, such as satellite, fiber optic, coaxial cable, cellular telephone, wireless (e.g., WiMAX), twisted pair telephone, etc., or any combination thereof. Video formatting system 109 may be configured to transmit the compressed frame synced video signals from components 111A, 111B, and 111C over the network 110. As such, a frame synced video signal according to any particularly desired compression format may be transmitted to any desired location. In some embodiments, network 110 may be operatively connected to, may incorporate one or more components, or may be network 105.

In some examples, a home of a user may be configured to receive data from network 110. The home of the user may include a home network configured to receive encapsulated 3D video content and distribute such to one or more viewing devices, such as televisions, computers, mobile video devices, 3D headsets, etc. For example, 3D video content may be configured for operation with a polarized lens headgear system. As such, a viewing device or centralized server may be configured to recognize and/or interface with the polarized lens headgear system to render an appropriate 3D video image for display.

In other examples, a computer may be configured to receive data from network 110 as streaming video. The computer may include a network connection to a closed system configured to receive encapsulated 3D video content and distribute such to one or more viewing devices that operate within a closed network. Such an example may be an intranet network.

FIG. 2 illustrates general hardware elements that can be used to implement any of the various computing devices discussed herein. The computing device 200 may include one or more processors 201, which may execute instructions of a computer program to perform any of the features described herein. The instructions may be stored in any type of non-transitory computer-readable medium or memory (e.g., disk drive or flash memory), to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired electronic storage medium. Instructions may also be stored in an attached (or internal) storage 205 (e.g., hard drive, flash, etc.). The computing device 200 may include one or more output devices, such as a display 206 (or an external television), and may include one or more output device controllers 207, such as a video processor. There may also be one or more user input devices 208, such as a remote control, keyboard, mouse, touch screen, microphone, etc. The computing device 200 may also include one or more network interfaces, such as input/output circuits 209 (such as a network card) to communicate with an external network 210. The network interface may be a wired interface, wireless interface, or a combination of the two. In some embodiments, the interface 209 may include a device such as a modem (e.g., a cable modem), and network 210 may include the external network 110, an in-home network, a provider's wireless, coaxial, fiber, or hybrid fiber/coaxial distribution system (e.g., a DOCSIS network), or any other desired network.

The FIG. 2 example is an example hardware configuration. Modifications may be made to add, remove, combine, divide, etc. components as desired. Additionally, the components illustrated may be implemented using basic computing devices and components, and the same components (e.g., processor 201, storage 202, user interface 205, etc.) may be used to implement any of the other computing devices and components described herein. For example, the various components herein may be implemented using computing devices having components such as a processor executing computer-executable instructions stored on a computer-readable medium, as illustrated in FIG. 2.

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the invention, and such data structures are contemplated within the scope of computer executable instructions and computer-usable data described herein.

Figure 3:
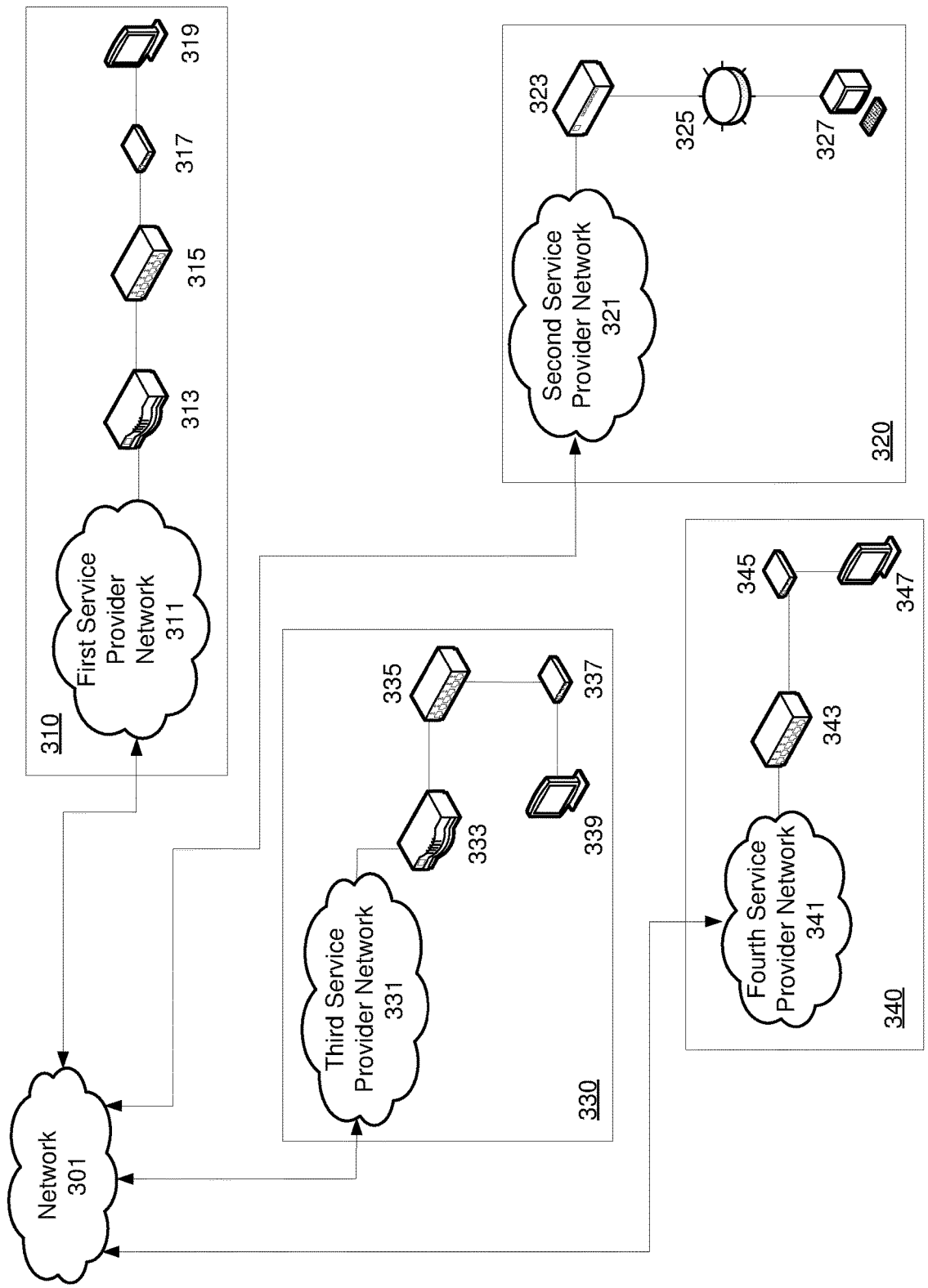
FIG. 3 illustrates an example system for distribution of content over a plurality of networks in accordance with one or more aspects of the present disclosure.

FIG. 3 illustrates an example system for access or distribution of video content over, for example, a plurality of different service provider networks in accordance with one or more aspects of the present disclosure. The different service provider networks can serve some or different geographic regions (e.g., one network 311 may serve users in Ohio while another network 331 may serve users in Pennsylvania), different access types (e.g., one network 311 may serve fiber optic/coaxial cable users in Pennsylvania, and another network 331 may serve wireless cellular customers in Pennsylvania), different IP services (e.g., two different web services offering streaming 3D video to their respective users), any other form of offering services to different users, and any combination or subcombination thereof. In the example of FIG. 3, a network 301 of a first service provider is shown operatively connected to a plurality of networks of other service providers, including network 311 of service provider 310, network 321 of service provider 320, network 331 of service provider 330, and network 341 of service provider 340. Alternatively, networks 301, 311, 321, 331, and 341 may be operated by one service provider. Network 301 as described herein may be operatively connected to, may incorporate one or more components, or may be network 110 described above with respect to FIG. 1. Network 301 may operate as a video distribution system to the networks 311, 321, 331, and 341.

Network 311 of service provider 310 may be a network for users of a competitor to the service provider transmitting data through network 301. In the example of a live 3D sporting event where the rights for capturing and distribution are owned by one service provider, competitor service providers may desire access to the same live 3D video and audio feeds. An arrangement may be in place between the service providers to allow access to the particular live 3D video content. However, in such situations, the transmission format for the network 311 may be different from the transmission format of the service provider providing the live 3D video signal through its network 301. A television 319 connected to the service provider 310 may be configured to receive and render 3D video content through, for example, a set-top box 317, a QAM 315, and a processing platform 313. Alternatively, this and other networks may communicate directly with a user's display device. Distribution through network 311 may require unicast transmissions while the backbone operation of network 301 may be a multicast transmission format. In accordance with the present disclosure, an IP network may be utilized for acquisition and distribution amongst various service providers.

Service provider 320 may stream live video content to users through a URL. A user to service provider 320 may access live video content originating from network 301 of a different service provider at a computer 327, through, for example, a content delivery network 325, an encoder 323, and network 321. Again, in such situations, the transmission format for the network 321 through, e.g., the competitor service provider 320 may be different from the transmission format of the service provider providing the live video signal through its network 301.

Like network 311 for service provider 310, network 331 of service provider 330 may be a network for users of a competitor to the service provider transmitting data through network 301. In such situations, the transmission format for the network 331 through the competitor service provider 330 may be different. A television 339 (or other display device) connected to the service provider 330 may be configured to receive and render video content through, for example, a set-top box 337, a QAM 335, and a processing platform 333.

Service provider 340 may be for users in an international market, such as Europe. A user to service provider 340 may access video content originating from network 301 of a different service provider at a display device 347 connected to the service provider 340. The display device 347 may be configured to receive and render video content through a set-top box 345, a QAM 343, or directly from network 341. In this example, network 341 may comprise, in whole or in part, a wireless network (e.g., satellite, cellular, WiMax, etc.). The transmission format for the network 341 through the competitor service provider 340 may be different from the transmission format of the service provider providing the live video signal through its network 301.

In one or more of the examples of FIG. 3, the video signal (e.g., a live video signal) from network 310 may be a 3D video signal, such as for a concert, a political event, and/or a sporting event. In some examples of FIG. 3, the live video signal from network 310 may include an audio signal associated with the live video signal. The audio signal may be directly and/or indirectly associated with the live video signal. Still further, one or more features of the distribution of the original live 3D video content from a source to network 110 in FIG. 1 may be utilized as the live video content distributed from network 310 in FIG. 3.

Figure 4:
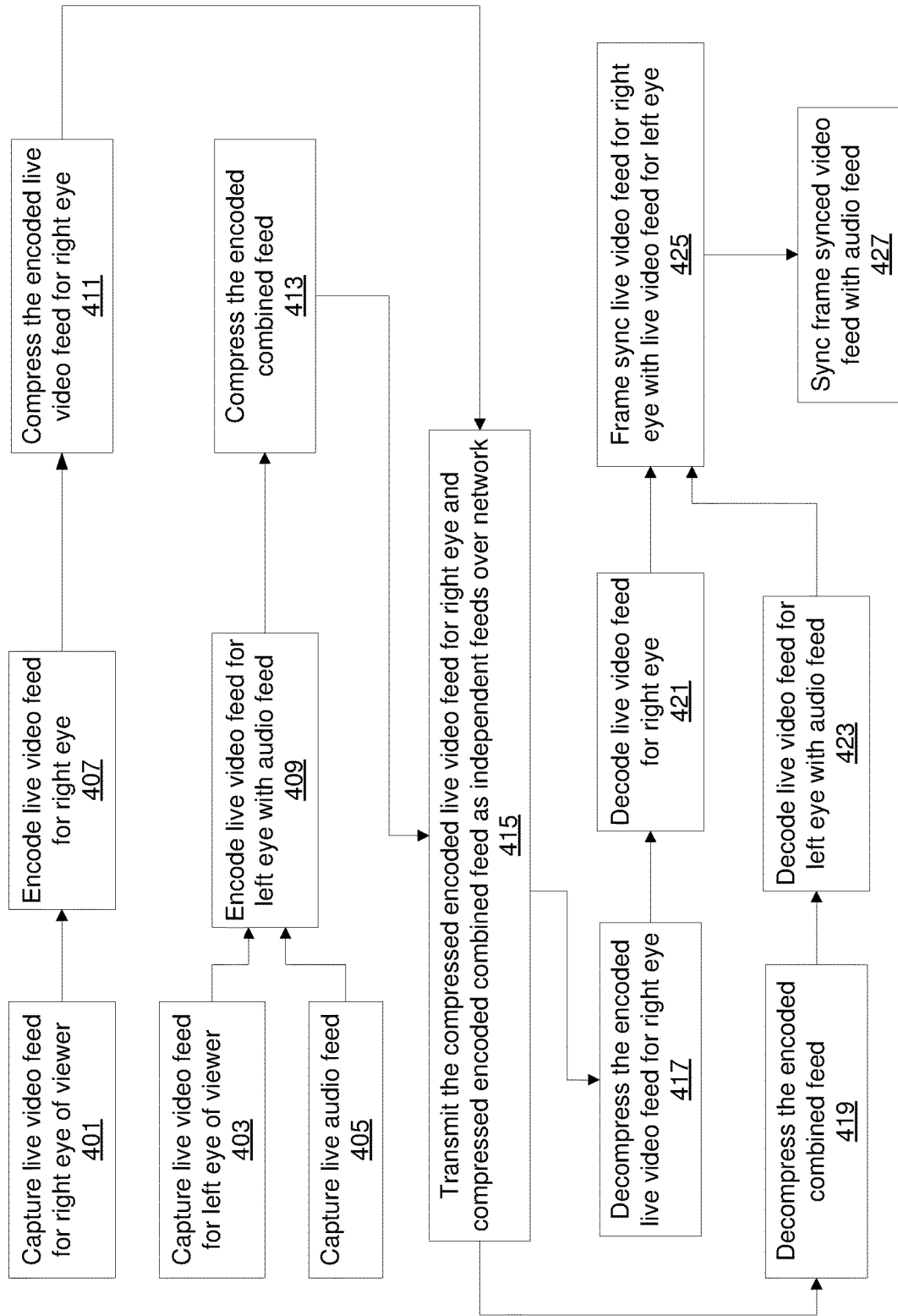
FIG. 4 illustrates an example video capture and distribution process in accordance with one or more aspects of the present disclosure.

FIG. 4 illustrates an example video distribution process in accordance with one or more aspects of the present disclosure. The various steps may be performed by different entities in the system (e.g., the cameras 101A, 101B, encoding system 102, audio recording device 103, stream generator 104, decoding system 107, frame syncing system 108, and video formatting system 109) as discussed herein. In step 401, a video feed for the right eye of a viewer may be captured by, for example, the camera 101A. In what may be a concurrent step, in 403, a video feed for the left eye of the viewer may be captured by, for example, camera 101B. In yet another step that may be concurrent, in 405, an audio feed associated with the video feeds may be captured by, for example, audio recording device 103.

In step 407, the captured live video feed for the right eye of the viewer may be encoded by, for example, encoding system 102, and in step 409, the captured live video feed for the left eye of the viewer may be encoded with the audio feed into an encoded combined signal by, for example, encoding system 102. Alternatively, the audio feed may be encoded separately or with the right eye video feed. Encoding of the video feeds may be desired in order to transport the video feeds from a first point to a second point over a known network configuration of a service provider to meet a specific frame size and format for a receiver. In 411, the encoded live video feed for the right eye of the viewer may be compressed, and in step 413, the encoded combined feed may also be compressed by, for example, the stream generator 104. Compression of the encoded video feeds may be desired in order to utilize less bandwidth in transmitting the encoded video feeds through a network.

Proceeding to step 415, the compressed encoded live video feed for the right eye and the compressed encoded combined feed may be transmitted over a network, for example over network 105, as two independent signals. One benefit of transmission of the video feeds as two independent feeds, e.g., IP streams, is that it ensures a full resolution signal (e.g., originally captured resolution video feed for each eye, as opposed to a frame synced half resolution video for each eye) may be transmitted for later processing before output to a viewer. Such a delay of frame syncing the left eye and the right eye video off-site from a point of origination allows for centralized processing of the signals. Thus, resources for later processing to frame sync the signals are reduced to the central location.

In step 417, which may be concurrently performed with step 419, the compressed encoded live video feed for the right eye of the viewer may be decompressed, and the compressed encoded combined feed may be decompressed, respectively, by, for example, decoding system 107. In step 421, the encoded live video feed for the right eye of the viewer may be decoded by, for example, decoding system 107, back to an original captured video format and in step 423, the encoded combined feed may be decoded into the live video feed for the left eye of the viewer and the audio feed by, for example, decoding system 107 back to an original captured video and audio format.

Proceeding to step 425, the live feed for the right eye that was captured in step 401 and the live feed for the left eye that was captured in step 403 are ready for frame syncing. In 425, each frame of video content may be synced between the feed for the right eye and the feed for the left eye by, for example, frame syncing system 108. The frame syncing of the two signals may be performed in any of a number of different manners. For example, for each frame of video content, the live feed for the right eye may be reduced by ½ resolution and placed in the upper half of a frame synced video signal. The live video feed for the left eye also may be reduced by ½ resolution and placed in the lower half of the frame synced video signal. Thus, the resulting frame synced video feed may be an over/under frame synced video feed. The live video feeds may be synced based upon a time sequence of the original recording of the live video feeds by the cameras.

The live video feeds may have been marked at predefined intervals with a time code that corresponds to a particular time in the captured video feeds for the right eye and the left eye of the viewer.

An end user's 3D viewing device may be configured to output the upper half of the frame synced video signal to a right eye of the viewer and to output the lower half of the frame synced video signal to a left eye of the viewer. Utilizing a frame synced video signal, the 3D viewing device (e.g., headgear) may create the appearance of live 3D video content for the viewer. As described herein, any of a number of different frame syncing formats may be utilized to frame sync the video feed for the right eye of a viewer with the live video feed for the left eye of the viewer and the present disclosure is not limited to any specific example herein.

Moving to step 427, if an audio signal was included with one of the video feeds for the left eye and/or video feed for the right eye in a combined feed, the audio signal may be synced to the sync framed video feed by, for example, frame syncing system 108. The audio signal may be synced with the frame synced video signal based upon a time sequence of the original recording of the audio stream by the audio recording system with the original capturing of the live video feeds by the cameras. The audio signal may have been marked at predefined intervals with a time code that corresponds to a particular time in the captured video feeds for the right eye and the left eye of the viewer.

In alternative embodiments of the example process of FIG. 4, two independent video feeds, one for the right eye of a viewer and one for the left eye of a viewer that were captured originally by two different cameras may be distributed and frame synced as a frame synced video feed without the inclusion of an audio signal. In such examples, in step 409, the video feed for the left eye of the viewer may be encoded without the inclusion of an audio feed. In step 413, the encoded live video feed for the left eye may be compressed, again without the inclusion of an audio feed. Transmission in step 415, decompression in step 419, and decoding in step 423 follow without the inclusion of any audio feed.

In addition, compressing and decompressing feeds may be an optional step. One or more steps may be implemented and/or not included. Still further, although the example of FIG. 4 illustrates an embodiment of encoding and transmitting an associated audio feed with the video feed for the left eye of a viewer, the associated audio feed may alternatively or concurrently be encoded and transmitted with the video feed for the right eye of the viewer.

Figure 5:
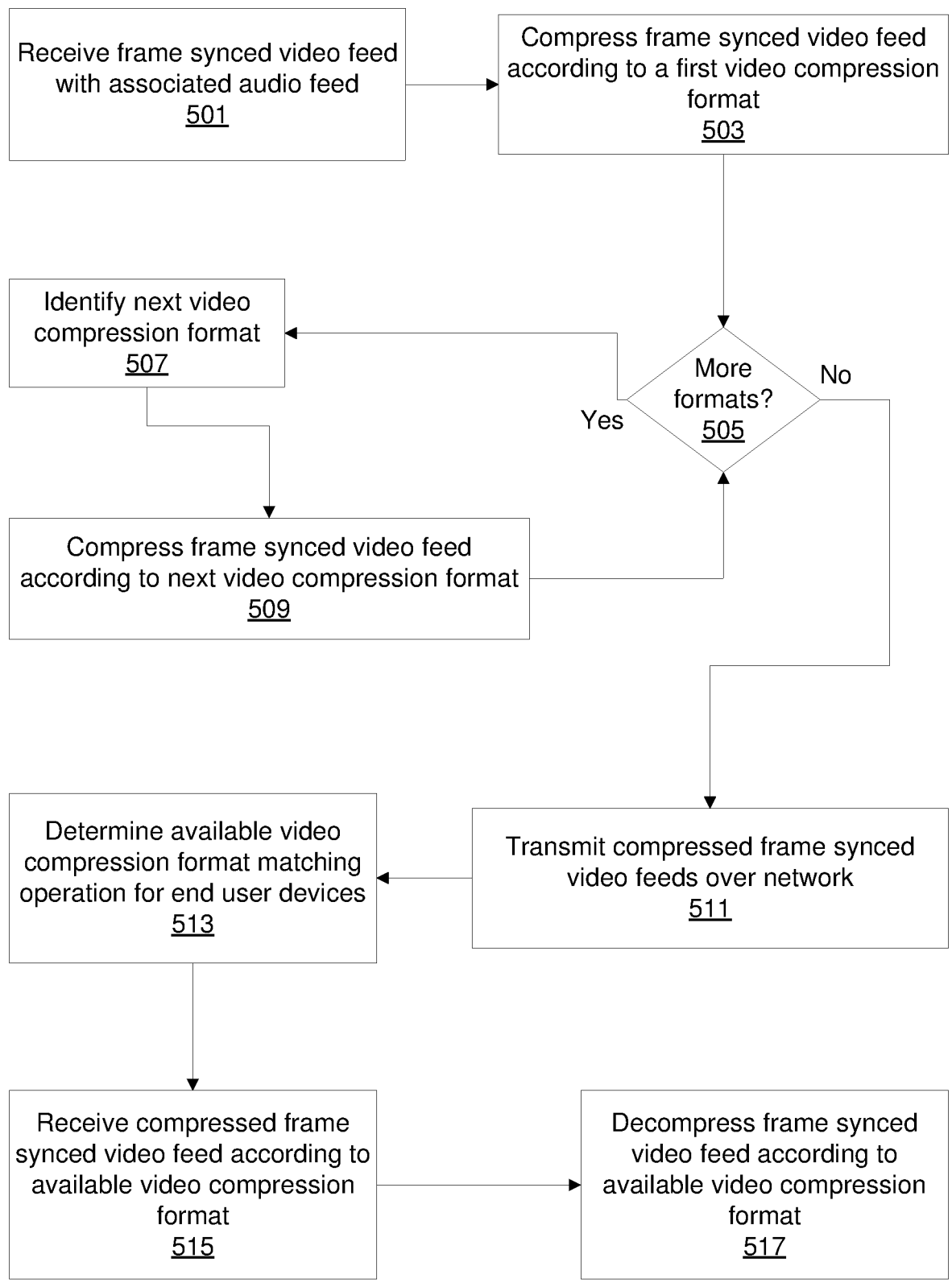
FIG. 5 illustrates an example video encoding process in accordance with one or more aspects of the present disclosure.

FIG. 5 illustrates an example video encoding process in accordance with one or more aspects of the present disclosure. The various steps may be performed by different entities in the system (e.g., the cameras 101A, 101B, encoding system 102, audio recording device 103, stream generator 104, decoding system 107, frame syncing system 108, and video formatting system 109) as discussed herein. In step 501, a frame synced live video feed with associated audio may be received by, for example, video formatting system 109. A service provider may want to distribute the frame synced live video feed in a number of different video formats in order to distribute the video content over a wider range of electronic devices configured to render the video content on an output device. For transmission through different networks and mediums, different compression formats may be needed.

Proceeding to step 503, the received frame synced video feed (e.g., live video feed) may be compressed in accordance with a first video compression format by, for example, H.264 component 111A, MPEG2 component 111B, and/or Windows Media 9 component 111C. Any of a number of different video compression formats may be utilized herein and the present disclosure should not be interpreted as limited to those described. Example video compression formats that may be utilized include MPEG2, H.264, and Windows Media 9.

The process then moves to step 505 where a determination may be made as to whether there are more compression formats associated with the distribution network of the service provider that are needed in order to transmit the frame synced live video feed to a larger pool of viewers utilizing different output devices for rendering the live video feed. If there is no other compression format needed, the process moves to step 511. If another compression format is needed in step 505, the process moves to step 507 where the next video compression format may be identified for implementation. For example, in step 503, the frame synced live video feed may be compressed in accordance with an H.264 compression format. In step 507, an MPEG2 video compression format may be identified as needed.

In step 509, the frame synced live video feed received in 501 may be compressed in accordance with the identified next video compression format. Thus, there now may be two compressed frame synced live video feeds, one compressed in accordance with the first format in step 503 and one compressed in accordance with the next identified compression format in step 509. The process may return to step 505 to determine, once again, if another compression format associated with the distribution network of the service provider is needed.

In step 511, the compressed frame synced live video feeds for each of the different compression formats are transmitted over a network, such as over network 110, as different compression format signals. As such, a service provider with some users/subscribers having end devices configured to receive and decompress signals of a first format and other users having end devices to receive and decompress signals of a second and different format may be able to receive and view the same live video content.

In step 513, a device associated with a subscriber/end user may determine an available frame synced live video feed of compression format that matches the compression format utilized by the end device, for example, in response to a user viewing an electronic program guide and opting to view a particular video program. In the examples described above, the end device of the user may utilize a frame synced live video feed according to an H.264 compression format.

Having determined the frame synced live video feed according to the matching compression format, in step 515, the matching compressed frame synced live video feed may be received by a subscriber/end user system. For example, a set-top box at a home of a user may be configured to receive such a compressed frame synced live video signal. Then, in step 517, the received compressed frame synced live video feed may be decompressed in order to render the live video content to an end user.

In other embodiments of the example process of FIG. 5, the frame synced live video feed may or may not include an audio signal associated with the frame synced live video feed. In such examples, the frame synced live video feed may include a similarly compressed audio feed. Then, in step 517, the audio signal may be decompressed from the frame synced live video feed as well.

In addition, the example in FIG. 5 may be implemented in accordance with one or more examples of embodiments of FIG. 4 described above. For example, the frame synced live video feed received in step 501 may be the same frame synced live video feed generated in step 425 in FIG. 4 or may be the frame synced live video feed generated in step 427 that includes an audio feed associated with the originally captured video.

Figure 6:
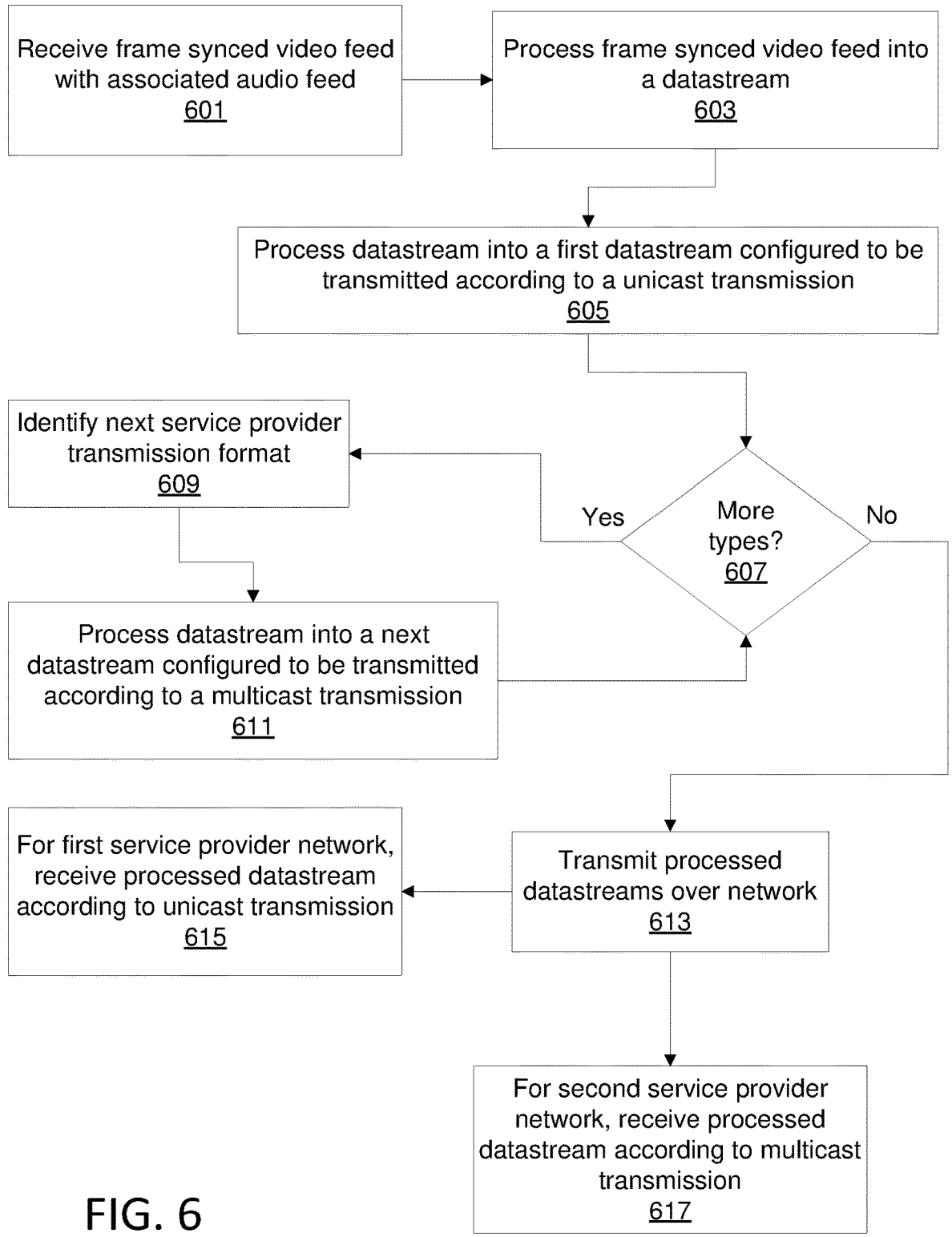
FIG. 6 illustrates an example video distribution process for a plurality of providers in accordance with one or more aspects of the present disclosure.

FIG. 6 illustrates an example video distribution process for a plurality of service providers in accordance with one or more aspects of the present disclosure. The various steps may be performed by different entities in the system (e.g., the cameras 101A, 101B, encoding system 102, audio recording device 103, stream generator 104, decoding system 107, frame syncing system 108, video formatting system 109, network 301, one or more components within service provider 310, one or more components within service provider 320, one or more components within service provider 330, and one or more components within service provider 340) as discussed herein. In step 601, a frame synced live video feed (or a non-live feed) with associated audio may be received by, for example, video formatting system 109. A service provider may want to distribute the frame synced live video feed through a number of different networks of other service providers in order to distribute the video content over a wider range of electronic devices configured to render the video content on an output device.

Proceeding to step 603, the received frame synced live video feed may be processed into a digital datastream by, for example, video formatting system 109. Any of a number of different datastream generated formats may be utilized herein and the present disclosure should not be interpreted as limited to those described. Example datastream generated formats that may be utilized include Internet Protocol streams, internetwork packet exchange streams, and Internet Group Management Protocol streams.

Some service providers might only use unicast transmissions for transports of video data across its network. In step 605, the datastream from step 603 may be further processed into a first datastream configured to be transmitted across a network according to a unicast transmission for such service providers by, for example, video formatting system 109. For example, a competitor service provider may want to receive and distribute the original frame synced live video feed from the originating service provider. In such an example, the competitor service provider may distribute in a unicast transmission. Accordingly, the first processed datastream configured for transmission as a unicast transmission in 605 may be utilized as described below.

In step 607, a determination may be made as to whether there are more service provider transmission types that are needed in order to transmit the frame synced live video feed to a larger pool of viewers across different service providers. If there are no other service provider types needed, the process moves to step 613. If another service provider type is needed in step 607, the process moves to step 609 where the next service provider transmission format may be identified for implementation.

In step 611, the datastream received in step 603 may be processed into a next datastream configured to be transmitted across a network according to a different transmission format, such as a multicast transmission by, for example, video formatting system 109. Thus, there now may be two datastreams for frame synced live video feeds, one datastream in accordance with the first format in step 605 and one datastream in accordance with the next identified format in step 611. The process may return to step 607 to determine, once again, if another service provider format type associated with the distribution network of another service provider is needed.

In step 613, the datastreams for each of the different service provider formats are transmitted over a network, such as over network 110, as different service provider formatted signals. As such, different service providers with networks configured to receive unicast transmission and/or networks configured to receive multicast transmission may be able to receive and view the same live video content. Thus, the different transmissions across a network, such as across network 110, may be signals with different transmission formats as well as signals with different frame syncing formats In step 615, for a first service provider network, the processed datastream for unicast transmission may be received. As such, the first service provider may transmit within its system accordingly. Similarly in step 617, for a second service provider network, the processed datastream for multicast transmission may be received. As such, the second service provider may transmit within its system accordingly.

In embodiments of the example process of FIG. 6, the processed datastreams may or may not include an audio signal associated with the frame synced live video feed. In still other embodiments, although described in FIG. 6 as a frame synced live video signal, the live video signal may be for 2D video rendering and a frame synced live video signal may not be needed. In such examples, the frame synced live video signal may be a live 2D video signal with, or without, an associated audio signal.

In addition, the example in FIG. 6 may be implemented in accordance with one or more examples of embodiments of FIGS. 4 and 5 described above. For example, the frame synced live video feed received in step 601 may be the same frame synced live video feed generated in step 425 in FIG. 4 or may be the frame synced live video feed generated in step 427 that includes an audio feed associated with the originally captured video.

Aspects of the disclosure have been described in terms of illustrative embodiments thereof. While illustrative systems and methods as described herein embodying various aspects of the present disclosure are shown, the disclosure is not limited to these embodiments. Modifications may be made by those skilled in the art, particularly in light of the foregoing teachings.

For example, the steps illustrated in the illustrative figures may be performed in other than the recited order, and that one or more steps illustrated may be optional in accordance with aspects of the disclosure. Modifications may be made without departing from the true spirit and scope of the present disclosure. The description is thus to be regarded as illustrative instead of restrictive on the present disclosure.

What is claimed is:
1. A method comprising:
receiving, by a computing device, a first Internet Protocol (IP) stream comprising a first video component of multidimensional content, wherein the first IP stream does not comprise audio;
receiving a second IP stream comprising a second video component of the multidimensional content and comprising audio;
synchronizing the first video component received via the first IP stream with the second video component received via the second IP stream, comprising gener- ating a frame synchronized video signal comprising the first video component and the second video component;
generating a first video content stream comprising the frame synchronized video signal in a first encoding format;
generating a second video content stream comprising the frame synchronized video signal in a second encoding format; and
causing synchronized output of the first video component received via the first IP stream, the second video component received via the second IP stream, and the audio received via the second IP stream.

2. The method of claim 1, wherein the synchronized output comprises a first audio-video signal encoded in a first format and a second audio-video signal encoded in a second format, wherein the first audio-video signal in the first format is synchronized with the second audio-video signal in the second format.

3. The method of claim 1, wherein the causing synchronized output of the first video component, the second video component, and the audio comprises transmitting a single encapsulated IP stream comprising the first video component, the second video component, and the audio.

4. The method of claim 1, wherein the first IP stream comprises a first encapsulated IP stream, and wherein the second IP stream comprises a second encapsulated IP stream.

5. The method of claim 1, wherein the synchronizing comprises comparing:
   a first plurality of time codes, associated with the first video component, and
   a second plurality of time codes, associated with the second video component.

6. The method of claim 1, wherein the causing the synchronized output comprises outputting, via a stereoscopic display device, the first video component and the second video component.

7. The method of claim 1, wherein the causing the synchronized output comprises transmitting, to a device separate from the computing device, the first video component and the second video component.

8. The method of claim 1, wherein the causing the synchronized output comprises transmitting the first video component via a third IP stream and transmitting the second video component via a fourth IP stream.

9. The method of claim 1, wherein the causing the synchronized output comprises multicasting, using a format that is based on a device separate from the computing device, and to a plurality of destinations, the first video component and the second video component.

10. The method of claim 1, wherein the first video component comprises a left eye view of the multidimensional content and the second video component comprises a right eye view of the multidimensional content.

11. An apparatus comprising:
   one or more processors: and
   memory storing instructions that, when executed by the one or more processors, cause the apparatus to:
      receive a first Internet Protocol (IP) stream comprising a first video component of multidimensional content, wherein the first IP stream does not comprise audio;
      receive a second IP stream comprising a second video component of the multidimensional content and comprising audio;
      synchronize the first video component received via the first IP stream with the second video component received via the second IP stream, comprising generating a frame synchronized video signal comprising the first video component and the second video component;
      generate a first video content stream comprising the frame synchronized video signal in a first encoding format;
      generate a second video content stream comprising the frame synchronized video signal in a second encoding format; and
      cause synchronized output of the first video component received via the first IP stream, the second video component received via the second IP stream, and the audio received via the second IP stream.

12. The apparatus of claim 11, wherein the synchronized output comprises a first audio-video signal encoded in a first format and a second audio-video signal encoded in a second format, wherein the first audio-video signal in the first format is synchronized with the second audio-video signal in the second format.

13. The apparatus of claim 11, wherein the instructions, when executed by the one or more processors, cause the apparatus to cause the synchronized output by at least transmitting a single encapsulated IP stream comprising the first video component, the second video component, and the audio.

14. The apparatus of claim 11, wherein the first IP stream comprises a first encapsulated IP stream, and wherein the second IP stream comprises a second encapsulated IP stream.

15. The apparatus of claim 11, wherein the instructions, when executed by the one or more processors, cause the apparatus to synchronize by at least comparing:
   a first plurality of time codes, associated with the first video component, and
   a second plurality of time codes, associated with the second video component.

16. The apparatus of claim 11, wherein the instructions, when executed by the one or more processors, cause the apparatus to cause the synchronized output by at least outputting, via a stereoscopic display device, the first video component and the second video component.

17. The apparatus of claim 11, wherein the instructions, when executed by the one or more processors, cause the apparatus to cause the synchronized output by at least transmitting, to a device separate from the apparatus, the first video component and the second video component.

18. The apparatus of claim 11, wherein the instructions, when executed by the one or more processors, cause the apparatus to cause the synchronized output by at least transmitting the first video component via a third IP stream and transmitting the second video component via a fourth IP stream.

19. The apparatus of claim 11, wherein the instructions, when executed by the one or more processors, cause the apparatus to cause the synchronized output by at least multicasting, using a format that is based on a device separate from the apparatus, and to a plurality of destinations, the first video component and the second video component.

20. The apparatus of claim 11, wherein the first video component comprises a left eye view of the multidimensional content and the second video component comprises a right eye view of the multidimensional content.

21. A non-transitory computer-readable medium storing instructions that, when executed by a computing device, cause:

receiving a first Internet Protocol (IP) stream comprising a first video component of multidimensional content, wherein the first IP stream does not comprise audio;

receiving a second IP stream comprising a second video component of the multidimensional content and comprising audio;

synchronizing the first video component received via the first IP stream with the second video component received via the second IP stream, comprising generating a frame synchronized video signal comprising the first video component and the second video component;

generating a first video content stream comprising the frame synchronized video signal in a first encoding format;

generating a second video content stream comprising the frame synchronized video signal in a second encoding format; and causing synchronized output of the first video component received via the first IP stream, the second video component received via the second IP stream, and the audio received via the second IP stream.

22. The non-transitory computer-readable medium of claim 21, wherein the synchronized output comprises a first audio-video signal encoded in a first format and a second audio-video signal encoded in a second format, wherein the first audio-video signal in the first format is synchronized with the second audio-video signal in the second format.

23. The non-transitory computer-readable medium of claim 21, wherein the instructions, when executed by the computing device, cause the synchronized output by at least causing transmitting a single encapsulated IP stream comprising the first video component, the second video component, and the audio.

24. The non-transitory computer-readable medium of claim 21, wherein the first IP stream comprises a first encapsulated IP stream, and wherein the second IP stream comprises a second encapsulated IP stream.

25. The non-transitory computer-readable medium of claim 21, wherein the instructions, when executed by the computing device, cause the synchronizing to comprise comparing:
a first plurality of time codes, associated with the first video component, and
a second plurality of time codes, associated with the second video component.

26. The non-transitory computer-readable medium of claim 21, wherein the instructions, when executed by the computing device, cause the synchronized output of the first video component and the second video component to be via a stereoscopic display device.

27. The non-transitory computer-readable medium of claim 21, wherein the instructions, when executed by the computing device, cause the synchronized output by at least causing transmitting, to a device separate from the computing device, the first video component and the second video component.

28. The non-transitory computer-readable medium of claim 21, wherein the instructions, when executed by the computing device, cause the synchronized output by at least causing transmitting the first video component via a third IP stream and transmitting the second video component via a fourth IP stream.

29. The non-transitory computer-readable medium of claim 21, wherein the instructions, when executed by the computing device, cause the synchronized output by at least causing multicasting, using a format that is based on a device separate from the computing device, and to a plurality of destinations, the first video component and the second video component.

30. The non-transitory computer-readable medium of claim 21, wherein the first video component comprises a left eye view of the multidimensional content and the second video component comprises a right eye view of the multidimensional content.

* * * * *